United States Patent
Al-Hazmi et al.

(10) Patent No.: US 12,460,956 B2
(45) Date of Patent: Nov. 4, 2025

(54) AUTOMATED ADJUSTABLE GEARED ORIFICE FLOW METER

(71) Applicant: SAUDI ARABIAN OIL COMPANY, Dhahran (SA)

(72) Inventors: Shadi Mohammed Al-Hazmi, Dhahran (SA); Mohannad Marie Al-Shahrani, Dhahran (SA); Hadi Abdulrahman Al-Shehri, Dhahran (SA); Ahmad Mohammad Al-Ahdal, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 475 days.

(21) Appl. No.: 18/160,023

(22) Filed: Jan. 26, 2023

(65) Prior Publication Data

US 2024/0255145 A1 Aug. 1, 2024

(51) Int. Cl.
*G01F 1/42* (2006.01)
*G01F 7/00* (2006.01)

(52) U.S. Cl.
CPC .............. *G01F 1/42* (2013.01); *G01F 7/005* (2013.01)

(58) Field of Classification Search
CPC ......... G01F 1/42; G01F 1/36–46; G01F 7/005
See application file for complete search history.

(56) References Cited

U.S. PATENT DOCUMENTS

| 4,790,194 A | * | 12/1988 | Bellows | G01F 7/00 73/861.53 |
| 7,255,012 B2 | * | 8/2007 | Hedtke | F16K 3/03 73/861.61 |
| 7,900,522 B2 | * | 3/2011 | Reeve | G01F 1/40 73/861.77 |
| 10,036,660 B2 | * | 7/2018 | Ishihara | G01F 1/42 |
| 10,161,772 B1 | * | 12/2018 | Inman | G01F 1/42 |
| 11,414,950 B2 | * | 8/2022 | Gallagher | F16K 3/03 |

OTHER PUBLICATIONS

Omega, What is a Variable Area Flow Meter? retrieved from https://www.omega.com/en-us/resources/variable-area-flow-meter on Jan. 26, 2023.

\* cited by examiner

*Primary Examiner* — Justin N Olamit
(74) *Attorney, Agent, or Firm* — Vorys, Sater, Seymour and Pease LLP

(57) ABSTRACT

A variable orifice flow meter system includes a housing defining a flow passage and at least one plate extending into the flow passage and defining an orifice. The at least one plate is movably supported such that a size of the orifice may be adjusted. Upstream and downstream pressure sensors may measure fluid pressures upstream and downstream of the orifice and a drive mechanism may move the at least one plate. A controller may instruct the drive mechanism to move the at least one the plate such that a predetermined orifice size is defined in response to detecting an upstream pressure within a predetermined pressure range, determine a pressure differential across the orifice and calculate a flow rate through the flow passage based on the pressure differential when the pressure differential meets a predetermined threshold.

15 Claims, 4 Drawing Sheets

AUTOMATED ADJUSTABLE GEARED ORIFICE FLOW METER

FIELD OF THE DISCLOSURE

The present disclosure relates generally to fluid flow sensors employed in oil and gas operations. More particularly, the disclosure relates to fluid flow sensors with an adjustable orifice for creating a pressure differential, wherein the pressure differential may be measured to determine a flow rate through the orifice.

BACKGROUND OF THE DISCLOSURE

Many industrial processes, including those related to the production, refining and transportation of hydrocarbons, for example, employ flow meters for determining characteristics of the flow in a pipe or other conduit. Many of these flow meters are differential pressure flow meters that determine fluid flow by measuring a pressure loss across a pipe restriction. By applying Bernoulli's Equation, which indicates that the speed of a fluid increases as its pressure decreases, a flow rate may be determined with two pressure measurements, one made on each side of the pipe restriction.

For a differential pressure flow meter to be effective, at least a minimum pressure loss must be achieved. Operators of many oil and gas systems, however, have very little control over the flow characteristics of a fluid being measured. Additionally, the composition of many of the hydrocarbon-based fluids supplied to a flow system will change unpredictably over time. Thus, many conduits are equipped with a plurality of different flow meters, each having a different sized orifice, to measure the flow rate through a single conduit. If at least one of the plurality of flow meters generates the minimum pressure loss for a particular flow rate, an adequate estimate of the flow rate may be determined. In some instances, more accurate estimates may be achieved by employing a single flow meter having a variably sized orifice, which can be adjusted to accommodate different flow regimes through the conduit.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a variable orifice flow meter system includes a housing defining a flow passage therethrough and at least one plate extendable into the flow passage thereby defining an orifice within the flow passage. The at least one plate is movably supported with respect to the housing such that a size of the orifice is adjusted by moving the at least one plate. An upstream pressure sensor is operable to measure an upstream fluid pressure in the flow passage upstream of the orifice and downstream pressure sensor is operable to measure a downstream fluid pressure in the flow passage downstream of the orifice. A drive mechanism is operably coupled to the at least one plate to move the at least one plate with respect to the housing and a controller is operably coupled to the upstream pressure sensor, the downstream pressure sensor and the drive mechanism. The controller is operable to (a) instruct the drive mechanism to move the at least one the plate such that a predetermined orifice size is defined in response to detecting an upstream pressure reading from the upstream pressure sensor within a predetermined pressure range, (b) determine a pressure differential across the orifice with the upstream pressure sensor and the downstream pressure sensor, and (c) calculate a flow rate through the flow passage based on the pressure differential when the pressure differential meets a predetermined threshold.

In another embodiment, a method of operating a flow control system includes (a) detecting an upstream fluid pressure in a flow passage upstream of an orifice defined by one or more plates extending into the flow passage, (b) comparing the upstream fluid pressure to a plurality of predefined pressure ranges and determining that the upstream fluid pressure lies within one of the predefined pressure ranges, (c) instructing a drive mechanism to move the one or more plates to adjust a size of the orifice such that a predetermined orifice size corresponding with the one of the predefined pressure ranges is defined, (d) determining a pressure differential in the flow passage across the orifice and (e) calculating a flow rate through the flow passage based on the pressure differential when the pressure differential meets a predetermined threshold associated with predetermined orifice size.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
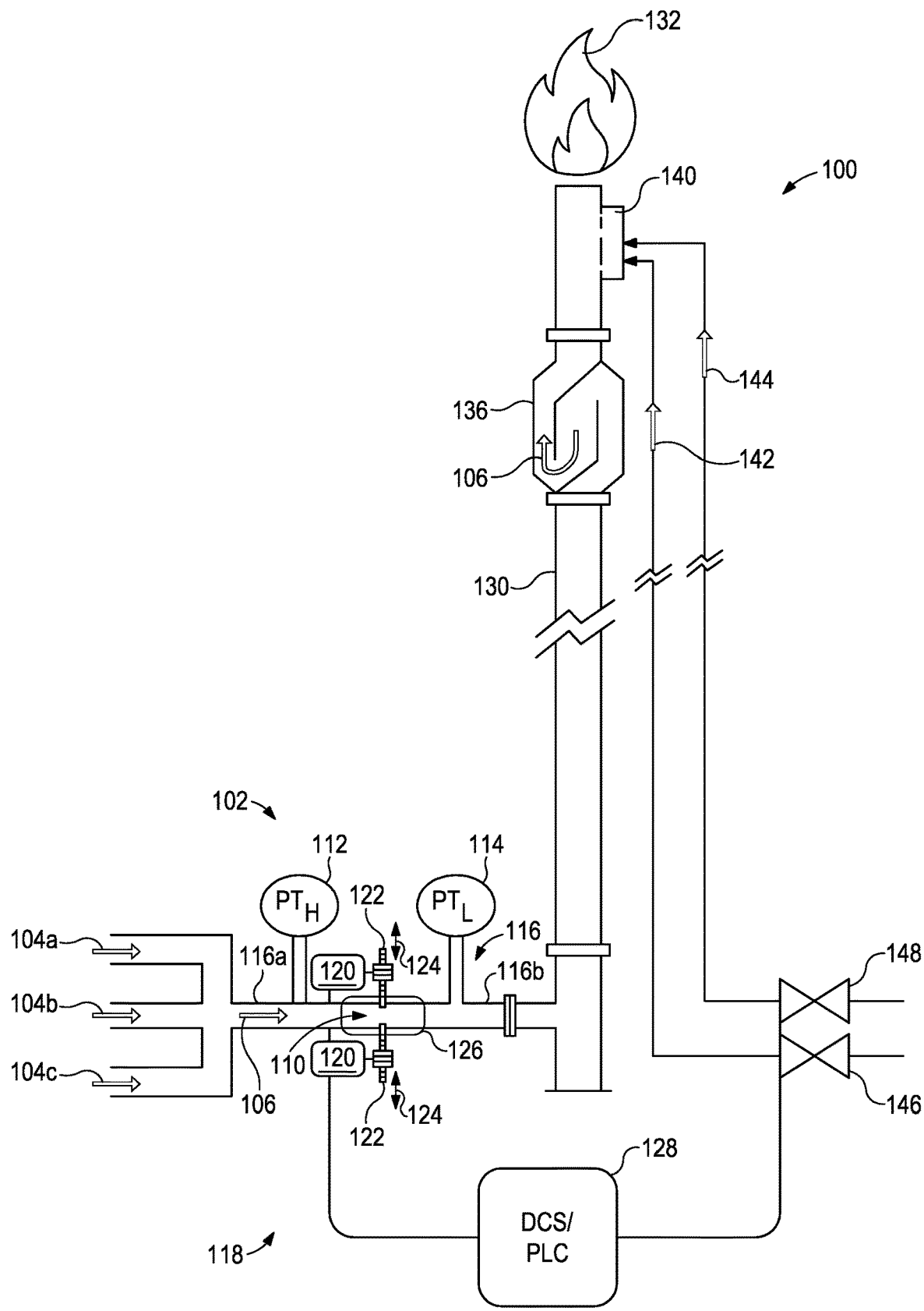
FIG. 1 is a schematic view of a flare system, which is one example of a hydrocarbon-based flow system that may employ a flow meter with an adjustable orifice in accordance with one or more aspects of the present disclosure.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to a differential pressure flow meter arranged to automatically adjust a size of an orifice to accommodate different flow characteristics of a fluid being measured. The orifice may be defined between a plurality of plates that are circumferentially spaced around a conduit and radially movable with respect to the conduit. One or more drive motors may be operably coupled to the plates to move the plates and thereby resize the orifice defined between the plates. The motors may be controlled based on a fluid pressure upstream of the orifice, and a controller may evaluate the upstream fluid pressure and determine a size of the orifice that will create a sufficient pressure drop to allow for an accurate estimate of the flow rate through the conduit to be determined. The controller may also instruct the motors to move the plates and fluid pressures upstream and downstream of the pressures may then be measured until at least the minimum pressure drop is detected. The flow rate through the conduit may then be accurately estimated with the measured pressures.

FIG. 1 is a schematic view of a flare system 100 including a flow meter 102 in accordance with one or more exemplary embodiments of the disclosure. It should be appreciated that the particular location of the flow meter 102 in the flare system 100 is merely one example of a location where the flow meter 102 in accordance with the present disclosure may be employed in the flare system 100. Generally, the flow meter 102 may be located in a straight and level section of pipe a sufficient distance (upstream and downstream) from any pipe fittings, obstructions, changes in diameter or direction or other mechanical change that might impact the flow dynamics of a fluid flowing through the flow meter 102. For example, the flow meter 102 may be disposed along a pipe or housing 116 of the flare system 100 at a distance of at least about twenty (20) times an inner diameter of the housing 116 from any upstream mechanical changes and a distance of at least ten (10) times the inner diameter of the housing 116. The flare system 100 is merely one example of a system in which the flow meter 102 may be employed. The flare system 100 may generally be used to safely burn waste gasses from an oil refinery, sewage digesters, ammonia fertilizer plants or other industrial facilities.

The flare system 100 includes one or more inlet streams 104a, 104b, 104c, which provide waste gasses to the flare system from various unpredictable sources. The inlet streams 104a, 104b, 104c may include combustible components such as volatile organic compounds (VOCs), methane, carbon monoxide (CO) and hydrogen ($H_2$). The inlet streams 104a, 104b, 104c may be combined to form a stream 106, which passes through the flow meter 102. In some applications, one or more of the inlet streams 104a, 104b, 104c and/or the combined stream 106 may undergo various processing operations not specifically discussed here before entering the flow meter 102 as appreciated by those skilled in the art.

The flow meter 102 generally includes an orifice 110 across which the combined stream 106 experiences a pressure loss. The pressure loss may be quantified by an upstream pressure sensor 112 and a downstream pressure sensor 114 extending into or otherwise in fluid communication with a housing 116 of the flow meter 102. The upstream pressure sensor 112 is disposed to measure a fluid pressure upstream of the orifice 110 and the downstream pressures sensor 114 is disposed to measure a fluid pressure downstream of the orifice 110. The upstream pressure sensor 112 may be fluidly coupled to an upstream conduit or pipe 116a of the housing 116 on an upstream side of the orifice 110 and the downstream pressure sensor 114 may be fluidly coupled to a downstream conduit or pipe 116b of the housing 116 on downstream side of the orifice 110. According to Bernoulli's Equation, where the pressure loss across the orifice 110 is sufficient, the pressure loss will be proportional to the square of the flow rate, and the flow rate of the combined stream 106 may be reliably estimated. Where the pressure loss is insufficient, however, any error in measurement may be amplified and the flow rate of the combined stream 106 may not be reliably estimated.

To ensure that the pressure loss across the orifice 110 is sufficient, the flow meter 110 includes an adjustment mechanism 118 for adjusting a cross-sectional area of the orifice 110. The adjustment mechanism 118 includes a drive mechanism such as one or more electric rotary motors 120 operably coupled to one or more plates 122 extendable into the orifice 110. In other embodiments, the drive mechanism 118 may alternatively include linear motors, pneumatic actuators or other motion control mechanisms recognized in the art. The plates 122 generally obstruct flow of the combined stream 106 through the orifice 110, but also cooperatively define the size and shape of the orifice 110. In example operation, the motors 120 may move the plates 122 radially inward and outward, as indicated by arrows 124, to adjust the size of the orifice 110.

A sealed compartment 126 may be provided around the orifice 110 to ensure any leaks from the upstream and downstream pipes 116a, 116b are contained as the plates 122 are moved. As illustrated in FIG. 1, the plates 122 and the housing 116 protrude from the sealed compartment 126, and thus, seals (not shown) may be provided between the sealed compartment 126 and the housing 116 and also between the sealed compartment 126 and the plates 122. In some embodiments, the seals are provided by welding the sealed compartment 126 to the housing 116, for example, and/or the seals may be dynamic elastomeric seals established between the sealed compartment 126 and the movable plates 122. The seals should be sufficient to ensure no fluid flowing through the flow meter 102 leaks to the surrounding atmosphere, especially if the fluid flowing through the flow meter 102 is acidic. In other embodiments, the sealed compartment 126 may be provided entirely around the plates 122 and/or motors 120 to ensure no leaks are created between the plates 122 and the sealed compartment 126.

The motors 122 may be controlled by a controller 128 such as a Distributed Control System (DCS) and/or a Programmable Logic Controller (PLC). As described in greater detail below, the controller 128 may determine a size of the orifice 110 that will provide a sufficient pressure loss to the combined fluid stream 106, and, based on the size of the orifice 110 determined, transmit command signals to the motors 120 to move the plates 122 toward or away from one another to change the size of the orifice 110 as necessary. In some embodiments, the controller 128 may be implemented as a computer system 400 (FIG. 4), as described in greater detail below.

The combined flow stream 106 may pass through the flow meter 102 and enter the base of a flare tower 130. The combined flow stream 106 may be burned as a flare 132 at a top of the flare tower 130. The height of the flare tower 130 generally elevates the location of the flare 132 so that it does not present a hazard to surrounding personnel and equipment. Before reaching the top of the flare tower 130, the combined stream 106 may pass through a gas seal or "trap" 136 installed in the flare tower 130. The gas trap 136 generally prevents backflow of air from wind and any hazardous gasses into the combined stream 106.

At the top of the flare tower 130, a pilot burner 140 is provided to assure the safe destruction (combustion) of any hydrocarbons sent to the flare 132. Pilot burners are designed for stability and may be positioned around an outer perimeter of the flare tower 130. Utilities such as an air stream 142 and a supplemental fuel stream 144 may be provided to the pilot burner 140 to sustain a stable flame even when the flow rate of the combined stream 106 is diminished. A flow rate of the air stream 142 and the supplemental fuel stream 144 may be determined based on the flow rate of the combined stream 106 determined by the flow meter 102. The controller 128 may be operable to control throttle valves 146, 148 in the air stream 142 and the supplemental fuel stream 144, respectively, to provide the desired flow rates in the air stream 142 and the supplemental fuel stream 144 based on the flow rate determined with the flow meter 102.

Figure 2:
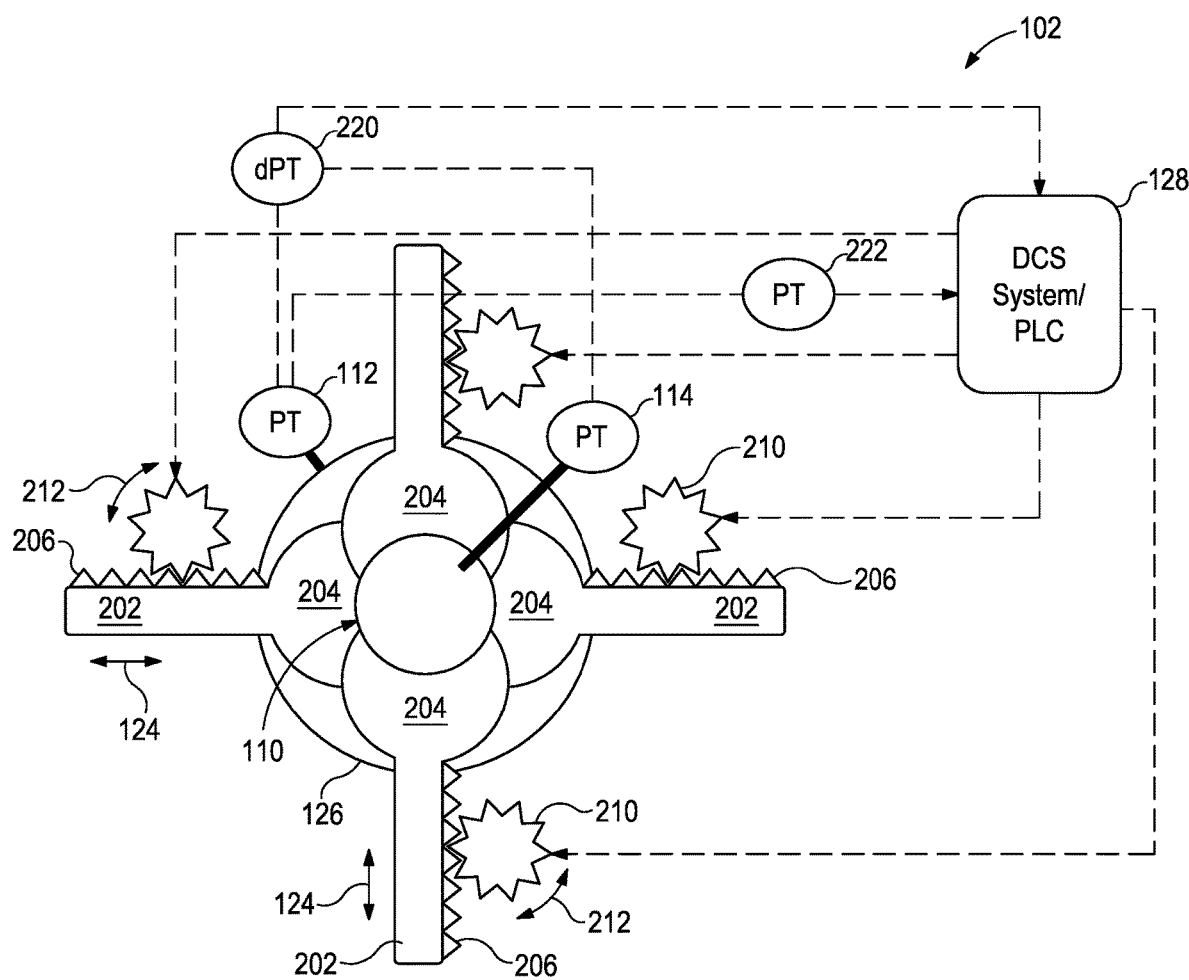
FIG. 2 is an enlarged schematic view of the flow meter of FIG. 1 illustrating a control system for automatically adjusting a size of the orifice.

Referring to FIG. 2, the flow meter 102 is described in greater detail. As illustrated, the orifice 110 may be cooperatively defined between and of the plates 122. In the illustrated embodiment, four plates 122 are circumferentially spaced around the orifice 110, generally disposed at right angles with respect to one another. In other embodiments, more or fewer plates 122 may be provided, without departing from the scope of the disclosure. The orifice 110 may be defined centrally or obliquely (off center) within the upstream and downstream pipes 116a, 116b (FIG. 1).

The plates 122 each include a drive end 202 extending out of the sealed compartment 126 and a broad blade end 204 extending into the sealed compartment 126. A curved indentation is formed in the blade end 204 of each of the plates 122 such that blade ends 204 together define a generally circular orifice 110 through which the combined flow stream 106 may pass.

The drive ends 202 of the plates 122 each support a rack gear 206 thereon and the rack gears 206 are engaged by corresponding pinion gears 210. The pinion gears 210 may be driven by the motors 120 (FIG. 1) to rotate in the direction of arrows 212. The rotational movement of the motors 120 is transferred to the plates 212 through interaction between the pinion gears 210 and the rack gears 206 to thereby drive the plates 122 radially inward or outward in the radial directions of arrows 124. Driving the plates 122 radially outward (away from one another) may increase the cross-sectional area of the orifice 110, and driving the plates 122 radially inwardly (toward one another), may decrease the cross-sectional area of the orifice 110. The pinion gears 210 are illustrated as being operably coupled to the controller 128 at least since the pinion gears 210 are driven by the motors 120 (FIG. 1), which are controlled by the controller 128 as described above.

The upstream and downstream pressure sensors 112, 114 are also operably coupled to the controller 128. The upstream and downstream pressure sensors 112, 114 are operable to provide the controller 128 with data from which a pressure differential 220 across the orifice 110 can be determined. The pressure differential 220 may represent a difference between readings from the upstream and downstream pressure sensors 112, 114. The pressure differential 220 is illustrated as being provided to the controller 128 as an input, but those skilled in the art will recognize that the pressure differential may be determined by the controller 128 with pressure readings from the upstream and downstream pressure sensors 112, 114 as inputs. An upstream pressure reading 222 may be provided to the controller 128 as input directly from the upstream pressure sensor 112 as shown. In other embodiments, the upstream pressure reading 222 may be provided by an independent sensor (not shown).

Figure 3:
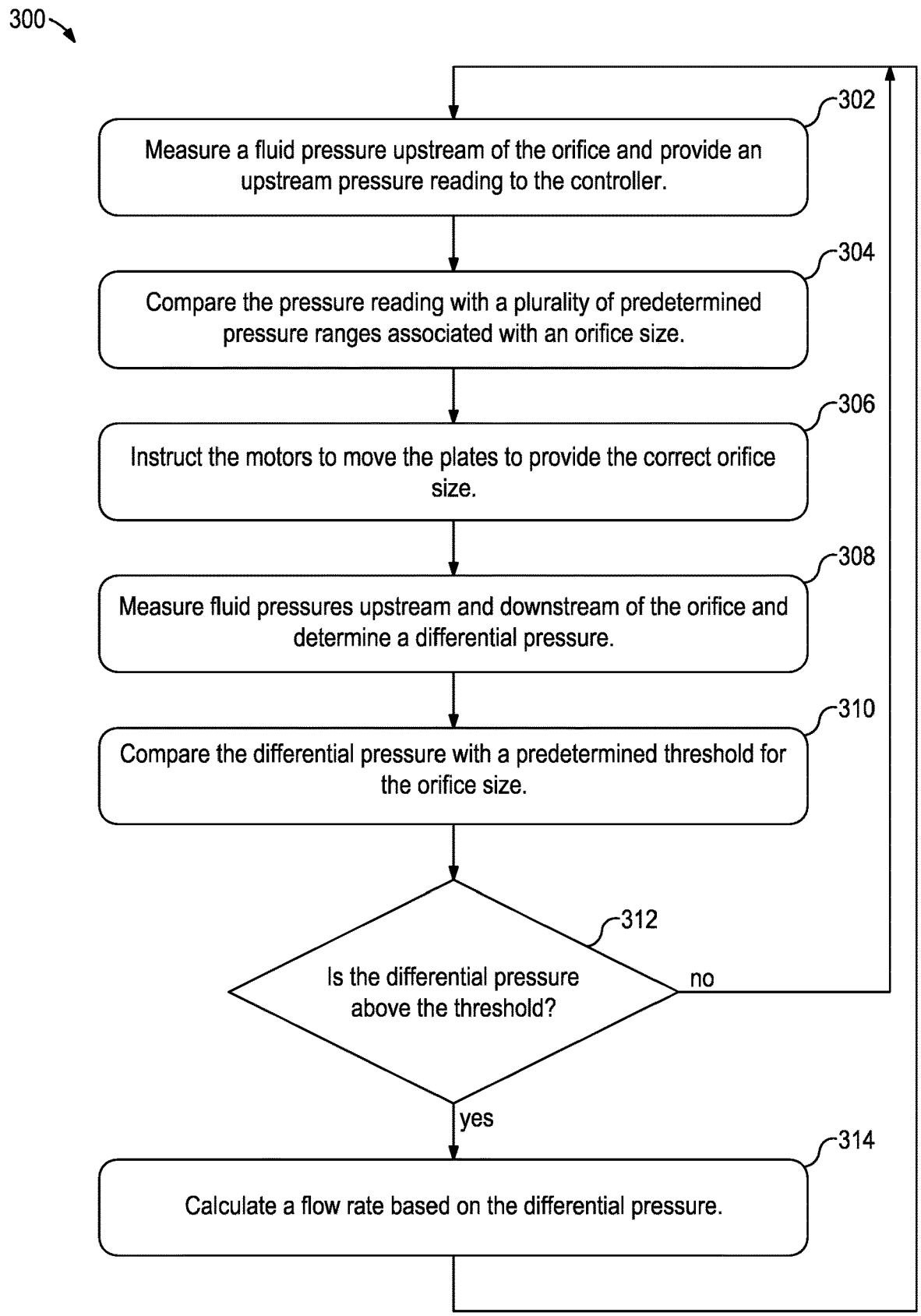
FIG. 3 is a flowchart illustrating a procedure for measuring a flow rate with the flow meter of FIG. 1 in accordance with embodiments of the present disclosure.

Referring to FIG. 3, and with continued reference to FIGS. 1 and 2, an operational procedure 300 for estimating a flow rate with the flow meter 102 is illustrated. Initially at step 302, a fluid pressure is measured upstream of the orifice 110. The fluid pressure measured may be a fluid pressure in the upstream pipe 116a measured using the upstream pressure sensor 112. The measured fluid pressure may be provided to the controller 128 as upstream pressure reading 222.

The procedure 300 then advances to step 304 where the upstream pressure reading 222 is compared with a plurality of predetermined pressure ranges by the controller 128. The predetermined pressure ranges may be established experimentally or empirically for each fluid and for each flow meter 102. The impact of the fluid resistance that is applied on the blade ends 204 of the plates 122 surrounding the orifice 110 is a function of the fluid properties and the mechanical properties of the housing 116 and plates 122 surrounding the orifice 110. Thus, the predetermined pressure ranges may differ for each application of the flow meter 102. Each of the predetermined pressure ranges may each be associated with a particular orifice size predetermined to provide a sufficient pressure differential for the pressure range in which the pressure reading 222 lies. For example, low, medium and high pressure ranges may be defined, which may be expected for low, medium and high flow rates of combined stream 106. The low pressure range may correspond to a small orifice size, the medium pressure range may correspond to a medium orifice size and the high pressure range may correspond to a large orifice size. If the pressure reading 222 lies in the low pressure range, for example, the small orifice size should be predetermined to provide a sufficient pressure loss to accurately estimate the flow rate of the combined stream 106 with the flow meter 102. The controller 128 may instruct the motors 120 (step 306) to move the plates 122, if necessary, such that the orifice 110 assumes has the orifice size associated with the pressure range in which the pressure reading 222 lies.

Next, in step 308, the fluid pressures upstream and downstream of the orifice 110 is measured with the upstream and downstream fluid sensors 112, 114. The controller 128 may subtract the pressure reading of the downstream fluid sensor 114 from the pressure reading of the upstream pressure sensor 112 to determine pressure differential 220. The controller 128 may compare the pressure differential 220 to an appropriate predetermined threshold for the size of the orifice 110 (step 310). Similar to the predetermined pressure ranges discussed above with reference to step 304, the appropriate predetermined threshold may be determined experimentally or empirically for each fluid and for each flow meter 102. The properties of the fluid flowing through the orifice 110 and the configuration of the orifice 110 will have a significant impact on the flow resistance and the pressure differential 220.

At decision 312, it is determined whether the pressure differential 220 meets or exceeds the predetermined threshold. If the pressure differential 220 does not meet the predetermined threshold, the flow meter 102 may not provide an accurate estimate of the flow rate. The procedure 300 then returns to step 302 where the procedure 300 begins again and a size of the orifice may be decreased. Eventually, the pressure differential 220 across the orifice 110 should become sufficient for the flow meter 102 to provide an accurate estimate. When pressure differential 220 does meet the predetermined threshold at decision 314, the procedure 300 proceeds to step 314 where a flow rate of the combined stream 106 is estimated based on the pressure differential 220. Other control operations may then be conducted based on the estimated flow rate. For example, the controller 128 may instruct the throttle valves 146, 148 to provide the desired flow rates in the air stream 142 and the supplemental fuel stream 144 based on the estimated flow rate.

The procedure 300 may then return to step 302 where the fluid pressure upstream of the orifice 110 is again measured. In this manner, changes in the combined stream 106 may be detected, and the size of the orifice 100 may be automatically updated to ensure that a sufficient pressure differential will be generated to provide accurate estimates of the flow rate using the flow meter 102.

In view of the foregoing structural and functional description, those skilled in the art will appreciate that portions of the embodiments may be embodied as a method, data processing system, or computer program product. Accordingly, these portions of the present embodiments may take the form of an entirely hardware embodiment, an entirely software embodiment, or an embodiment combining software and hardware, such as shown and described with respect to the computer system of FIG. 4. Furthermore, portions of the embodiments may be a computer program product on a computer-usable storage medium having computer readable program code on the medium. Any non-transitory, tangible storage media possessing structure may be utilized including, but not limited to, static and dynamic storage devices, hard disks, optical storage devices, and magnetic storage devices, but excludes any medium that is not eligible for patent protection under 35 U.S.C. § 101 (such as a propagating electrical or electromagnetic signal per se). As an example and not by way of limitation, a computer-readable storage media may include a semiconductor-based circuit or device or other IC (such, as for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, nonvolatile, or a combination of volatile and non-volatile, where appropriate.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Figure 4:
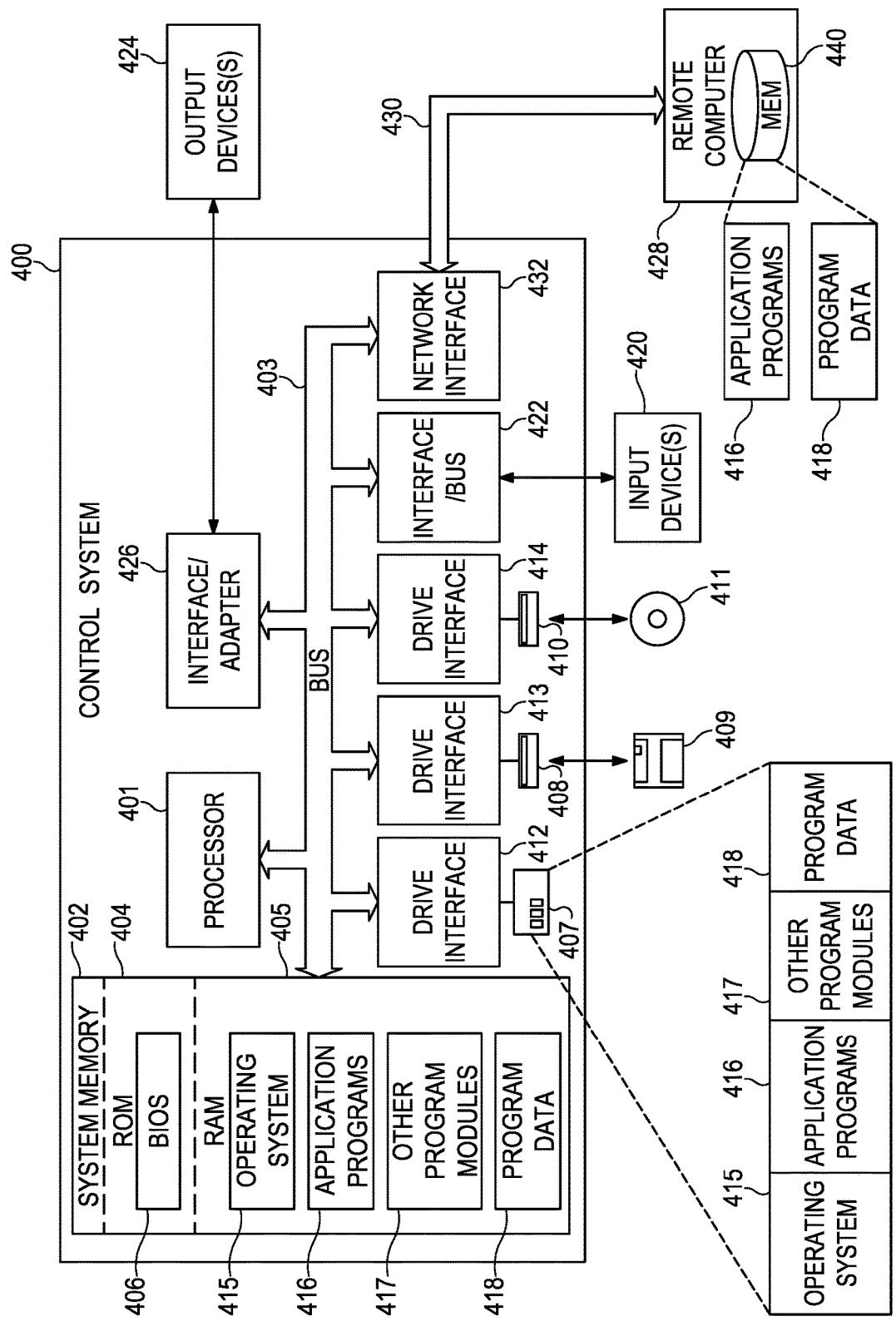
FIG. 4 is a block diagram of non-limiting example computer environment that may be employed to implement one or more procedures described herein.

In this regard, FIG. 4 illustrates one example of a computer system 400 that can be employed to execute one or more embodiments of the present disclosure. Computer system 400 can be implemented on one or more general purpose networked computer systems, embedded computer systems, routers, switches, server devices, client devices, various intermediate devices/nodes or standalone computer systems. Additionally, computer system 400 can be implemented on various mobile clients such as, for example, a personal digital assistant (PDA), laptop computer, pager, and the like, provided it includes sufficient processing capabilities.

Computer system 400 includes processing unit 401, system memory 402, and system bus 403 that couples various system components, including the system memory 402, to processing unit 401. Dual microprocessors and other multi-processor architectures also can be used as processing unit 401. System bus 403 may be any of several types of bus structure including a memory bus or memory controller, a peripheral bus, and a local bus using any of a variety of bus architectures. System memory 402 includes read only memory (ROM) 404 and random access memory (RAM) 405. A basic input/output system (BIOS) 406 can reside in ROM 404 containing the basic routines that help to transfer information among elements within computer system 400.

Computer system 400 can include a hard disk drive 407, magnetic disk drive 408, e.g., to read from or write to removable disk 409, and an optical disk drive 410, e.g., for reading CD-ROM disk 411 or to read from or write to other optical media. Hard disk drive 407, magnetic disk drive 408, and optical disk drive 410 are connected to system bus 403 by a hard disk drive interface 412, a magnetic disk drive interface 413, and an optical drive interface 414, respectively. The drives and associated computer-readable media provide nonvolatile storage of data, data structures, and computer-executable instructions for computer system 400. Although the description of computer-readable media above refers to a hard disk, a removable magnetic disk and a CD, other types of media that are readable by a computer, such as magnetic cassettes, flash memory cards, digital video disks and the like, in a variety of forms, may also be used in the operating environment; further, any such media may contain computer-executable instructions for implementing one or more parts of embodiments shown and described herein.

A number of program modules may be stored in drives and RAM 405, including operating system 415, one or more application programs 416, other program modules 417, and program data 418. In some examples, the application programs 416 can include an algorithm for comparing the upstream pressure reading 222 with the predetermined ranges as described with above with reference to step 302 of the procedure 300 (FIG. 3). Modules for instructing the motors 120 (step 306), calculating the pressure differential 220, comparing the pressure differential with a predetermined orifice size (step 310) and calculating a flow rate based on the pressure differential (step 314) may also be included in the application programs 416. The program data 418 can include the pressure differential 220, upstream pressure reading 222, the predefined pressure ranges used in step 304 and thresholds used in step 310. The application programs 416 and program data 418 can include functions and methods programmed to monitor performance characteristics of the flare system 100 and provide instructions to the throttle valves 148, 146 or other equipment based on a flow rate determined using the flow meter 102, such as shown and described herein.

A user may enter commands and information into computer system 400 through one or more input devices 420, such as a pointing device (e.g., a mouse, touch screen), keyboard, microphone, joystick, game pad, scanner, and the like. For instance, the user can employ input device 420 to enter predefined pressure ranges for comparison with the upstream pressure reading 222 in step 304, and predefined thresholds for comparison with the pressure differential 220 in step 310. These and other input devices 420 are often connected to processing unit 402 through a corresponding port interface 422 that is coupled to the system bus, but may be connected by other interfaces, such as a parallel port, serial port, or universal serial bus (USB). One or more output devices 424 (e.g., display, a monitor, printer, projector, or other type of displaying device) is also connected to system bus 403 via interface 426, such as a video adapter.

Computer system 400 may operate in a networked environment using logical connections to one or more remote computers, such as remote computer 428. Remote computer 428 may be a workstation, computer system, router, peer device, or other common network node, and typically includes many or all the elements described relative to computer system 400. The logical connections, schematically indicated at 430, can include a local area network (LAN) and a wide area network (WAN). When used in a LAN networking environment, computer system 400 can be connected to the local network through a network interface or adapter 432. When used in a WAN networking environment, computer system 400 can include a modem, or can be connected to a communications server on the LAN. The modem, which may be internal or external, can be connected to system bus 403 via an appropriate port interface. In a networked environment, application programs 416 or program data 418 depicted relative to computer system 400, or portions thereof, may be stored in a remote memory storage device 440.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A variable orifice flow meter system, comprising:
   a housing defining a flow passage therethrough;
   at least one plate extendable into the flow passage and thereby defining an orifice within the flow passage, the at least one plate being movably supported with respect to the housing such that a size of the orifice is adjusted by moving the at least one plate;
   an upstream pressure sensor operable to measure an upstream fluid pressure in the flow passage upstream of the orifice;
   a downstream pressure sensor operable to measure a downstream fluid pressure in the flow passage downstream of the orifice;
   a drive mechanism operably coupled to the at least one plate to move the at least one plate with respect to the housing; and
   a controller operably coupled to the upstream pressure sensor, the downstream pressure sensor and the drive mechanism, the controller being operable to:
      instruct the drive mechanism to move the at least one the plate such that a predetermined orifice size is defined in response to detecting an upstream pressure reading from the upstream pressure sensor within a predetermined pressure range,
      determine a pressure differential across the orifice with the upstream pressure sensor and the downstream pressure sensor, and
      calculate a flow rate through the flow passage based on the pressure differential when the pressure differential meets a predetermined threshold.

2. The system of claim 1, wherein the at least one plate includes a plurality of plates circumferentially spaced around the housing, and wherein the orifice is cooperatively defined between the plurality of plates.

3. The system of claim 2, wherein the orifice is generally circular and defined by a curved indentation formed in a blade end of each of the plurality of plates.

4. The system of claim 2, wherein the drive mechanism includes a plurality of electric motors, wherein each of the electric motors is operably coupled to a drive end of a respective plate by a pinion gear and a rack gear.

5. The system of claim 1, further comprising a sealed compartment disposed around the housing and the orifice.

6. The system of claim 1, wherein the controller includes a distributed control system or a programmable logic controller.

7. The system of claim 1, wherein the flow passage through the housing is fluidly coupled to a gas stream flowing to a flare stack for combusting hydrocarbon gasses in the gas stream.

8. The system of claim 7, wherein the controller is operably coupled to a controlled device and operable to instruct the controlled device to operate based on the flow rate through the flow passage.

9. A method of operating a flow control system, the method comprising:
    detecting an upstream fluid pressure in a flow passage upstream of an orifice defined by one or more plates extending into the flow passage;
    comparing the upstream fluid pressure to a plurality of predefined pressure ranges and determining that the upstream fluid pressure lies within one of the predefined pressure ranges;
    instructing a drive mechanism to move the one or more plates to adjust a size of the orifice such that a predetermined orifice size corresponding with the one of the predefined pressure ranges is defined;
    determining a pressure differential in the flow passage across the orifice; and
    calculating a flow rate through the flow passage based on the pressure differential when the pressure differential meets a predetermined threshold associated with predetermined orifice size.

10. The method of claim 9, wherein determining the pressure differential includes measuring the upstream fluid pressure with an upstream pressure sensor fluidly coupled to the flow passage upstream of the orifice and measuring a downstream fluid pressure with a downstream pressure sensor fluidly coupled to the flow passage downstream of the orifice.

11. The method of claim 9, further comprising decreasing the size of the orifice in response to determining that the differential pressure does not meet the predetermined threshold.

12. The method of claim 9, wherein the one or more plates include a plurality of plates circumferentially spaced around the orifice, and wherein instructing the drive mechanism includes instructing a plurality of electric motors operably coupled to the plurality of plates.

13. The method of claim 12, further comprising transmitting rotary motion from the plurality of motors to the plurality of plates with a pinion gear and a rack gear to translate the plurality of plates in radial directions.

14. The method of claim 9, further comprising operating a controlled device based on calculating the flow rate through the flow passage.

15. The method of claim 14, wherein flow rate calculated is a flow rate of a gas stream flowing to a flare stack for combusting hydrocarbon gasses in the gas stream, and wherein the controlled device is a valve for operable to control the delivery of utilities to the flare stack.

* * * * *